UNITED STATES PATENT OFFICE.

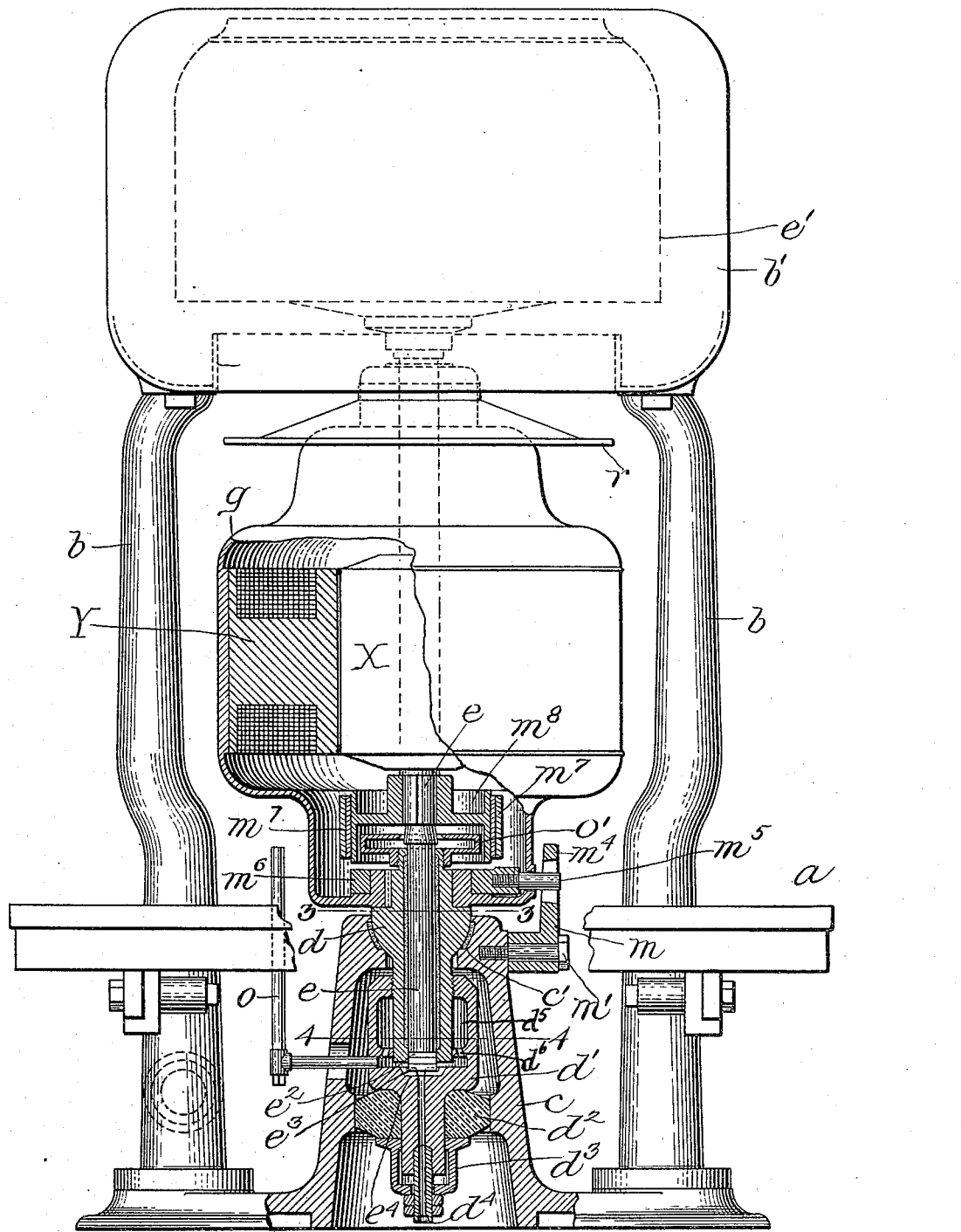

MELVILLE H. BARKER, OF BOSTON, MASSACHUSETTS.

BEARING FOR CENTRIFUGAL MACHINES.

1,146,392.  Specification of Letters Patent.  Patented July 13, 1915.

Application filed July 18, 1904. Serial No. 217,107.

*To all whom it may concern:*

Be it known that I, MELVILLE H. BARKER, citizen of the United States, and resident of Boston, Massachusetts, county of Suffolk, have invented certain new and useful Improvements in Bearings for Centrifugal Machines, of which the following is a specification.

This invention relates to centrifugal machines and more particularly to that class known as hydro extractors, which are provided with a receptacle constructed to be rotated at a high rate of speed, provision being made to permit a slight oscillatory or gyratory movement of the shaft.

The present invention comprises a construction and arrangement whereby a machine of this type may be economically driven by means of a direct connected electric motor, the construction and arrangement being such as to maintain the motor parts in constant operative relationship to each other by permitting their simultaneous oscillation while any excess of strain or wear upon the bearings is avoided.

In the accompanying drawings I have illustrated one of the forms under which the principles of this invention may be embodied but it will be understood that changes may be made in the particular form, construction and arrangement of parts without departing from the spirit of my invention.

The figure of said drawings illustrates a side elevation, the bearing portion in central section, of a machine embodying the principles of this invention.

In the drawings $a$ designates the floor or platform upon which the operator stands in manipulating the machine. Through the floor rise supporting standards or pillars $b$ upon which is mounted the stationary casing $b'$ surrounding the receptacle.

A floor bracket $c$ forms the main support for the centrifugal and at its upper end is provided with a spherical socket or bowl indicated at $c'$ in which is seated an oscillatory sleeve $d$ provided with a spherical bearing surface adapted to rest in said socket $c'$ so as to permit a slight oscillation. The downward extension $d'$ of this bearing sleeve is surrounded by an elastic buffer or washer $d^2$ which bears against the bracket $c$ in such manner as to afford a yielding resistance to the oscillatory movements of the oscillatory sleeve. This washer is clamped in place by means of a cap $d^3$ which is held in place by a bolt $d^4$ tapped into the lower end of the extension $d'$ provided with suitable clamping nuts.

The occillatory sleeve $d$ is provided with a central axial bore in which is seated a rotary driving and basket-supporting shaft $e$ whose upper end is secured to a common form of receptacle $e'$. This shaft may have any suitable rotary bearing engagement with the occillatory sleeve but in this instance I have shown a thrust bearing comprising a series of washers $e^2$ and a square washer or bearing plate $e^3$ adapted to rest in a rectangular socket $e^4$ formed in the sleeve $d'$, the object being to secure an anti-friction bearing for offording a rotatable engagement between the rotary shaft and the non-rotatable oscillatory sleeve, it being understood that any other suitable form of anti-friction bearing may be used for this purpose.

The upper end of the extension head $d'$ is hollowed out to form an oil reservoir as indicated, said reservoir being provided with inlet holes $d^6$ communicating with the oil inlet pipe $o$ to admit the oil into the oil cup or reservoir $d^5$ for storage. The lower part of the extension head $d'$ is provided with an axial bore through which the oil may be drawn off when desired when the machine is at rest and which may during the normal usage of the machine be kept plugged up.

In order to secure perfect lubrication of the shaft, I provide an oil pipe $o$ which communicates at its lower end with the hollow portion of the sleeve $d'$ so that the oil may freely lubricate the bearing washers and also pass up through the central bore of the sleeve $d$ outside of the shaft $e$. Above the sleeve $d$ I provide an overflow oil cup $o'$ which serves to contain the upwardly flowing oil while preventing its flowing outside of the interior recesses in which it is needed.

Between the oscillatory bearing and the receptacle or basket $e'$ is placed any suitable form of electric motor, the rotary element X of which is secured directly to the rotary shaft $e$, the non-rotatable element Y being carried by a frame $g$ extending upward from the oscillatory sleeve $d$ so as to partake fully of the oscillations of the shaft and its supporting sleeve. By this construction the weight of the heavy armature is kept from adding any extra strain or stress upon the driving shaft, while a constant relationship between the two motor parts is always secured.

The brake shoes $m^7$ surrounding the brake wheel or hub $m^8$ is operated by the oscillatory ring $m^6$ through the agency of the projecting pin $m^5$ and the actuating lever $m$ which is pivotally mounted on the stud $m'$. As this brake construction forms no part of the invention claimed herein, further particulars of its construction are unnecessary.

As the rotatable vertical basket-supporting shaft has its bearing in the sleeve $d$ which is deflectable about a point beneath the motor, it is obvious that both motor and basket are permitted an oscillatory movement about this point in order that the shaft may have a slight gyratory movement as it rotates upon the universal joint by which it is supported. As both elements of the motor are in effect carried upon this universal joint, their arcs of oscillation are concentric and hence they always maintain the proper operative relationship to one another unaffected by the gyration of the shaft when in rotation.

Without attempting to set forth all the changes in form, construction and arrangement that may be made in the practice of my invention, or all the uses to which it may be applied, what I claim is:—

1. In a centrifugal machine the combination of the fixed bracket or support provided with a spherical socket, a rotary shaft having a basket secured to its upper end, an oscillatory non-rotatable sleeve surrounding the lower end of said shaft and provided with a spherical bearing head adapted to be seated in the socket of said fixed bracket, an oil cap secured to and inclosing the lower end of said sleeve to form an oil chamber adjacent thereto, an anti-friction thrust bearing seated in said inclosing cap, and an elastic buffer interposed between said cap and the surrounding wall of the fixed bracket, substantially as described.

2. In an under-driven centrifugal machine the combination of a basket-supporting shaft, an oscillatory bearing sleeve surrounding the lower part of said shaft and supported by a ball and socket joint, an oil cap surrounding the lower end of said bearing sleeve and rigidly secured thereto, an anti-friction step bearing inclosed in said oil cap in position to receive and support the thrust of said shaft, an oil feed pipe secured to said cap to supply oil to its interior, and a supplemental oil cap secured to the upper end of said sleeve and surrounding the shaft, substantially as described.

3. In an under-driven centrifugal machine the combination with the rotary basket-supporting shaft, the oscillatory sleeve supported by a ball and socket joint to afford lateral bearing for said shaft, a hollow cap inclosing the lower end of said sleeve and containing an anti-friction thrust bearing to support the lower end of the shaft, an elastic annular buffer surrounding said cap and engaging the same to afford a yielding lateral resistance to the oscillation of the cap and sleeve, and a compression nut secured to the lower end of said cap to compress said buffer in order to increase its resistance, substantially as described.

In witness whereof, I have hereunto set my hand, this 11th day of July 1904.

MELVILLE H. BARKER.

In the presence of—
GEO. N. GODDARD,
KATHERINE A. DUGAN.